United States Patent
Ballenger et al.

(10) Patent No.: US 7,273,068 B2
(45) Date of Patent: Sep. 25, 2007

(54) ELECTRIC DRIVEN, INTEGRATED METERING AND SHUTOFF VALVE FOR FLUID FLOW CONTROL

(75) Inventors: Devane R. Ballenger, Mishawaka, IN (US); Stephen M. Emo, Elkhart, IN (US); William Lorenz, Dowagiac, MI (US); Kenneth L. Miller, New Paris, IN (US)

(73) Assignee: Honeywell International, Inc., Morristown, NJ (US)

( * ) Notice: Subject to any disclaimer, the term of this patent is extended or adjusted under 35 U.S.C. 154(b) by 413 days.

(21) Appl. No.: 10/794,692

(22) Filed: Mar. 5, 2004

(65) Prior Publication Data

US 2005/0150547 A1 Jul. 14, 2005

Related U.S. Application Data

(60) Provisional application No. 60/536,240, filed on Jan. 14, 2004.

(51) Int. Cl.
*F16K 37/00* (2006.01)
*F16K 11/078* (2006.01)
*F16K 5/10* (2006.01)

(52) U.S. Cl. ............ 137/554; 137/625.17; 137/625.3; 137/68.19; 251/129.11; 251/209; 251/313

(58) Field of Classification Search ............ 137/68.19, 137/554, 625.3, 625.31, 625.32, 625.17; 251/129.11, 208, 209, 313
See application file for complete search history.

(56) References Cited

U.S. PATENT DOCUMENTS

| | | | |
|---|---|---|---|
| 2,402,826 A * | 6/1946 | Lubbock ................. | 137/68.23 |
| 3,964,728 A * | 6/1976 | Flider ..................... | 251/313 |
| 4,328,832 A * | 5/1982 | Inada et al. ............. | 251/208 |
| 4,700,748 A * | 10/1987 | Fossati et al. ........... | 137/554 |
| 4,738,283 A * | 4/1988 | Shirai et al. ............ | 137/625.3 |
| 4,794,845 A | 1/1989 | Vick | |
| 4,892,286 A | 1/1990 | Reinicke | |
| 4,909,212 A * | 3/1990 | Minowa et al. ......... | 251/129.11 |
| 4,909,716 A | 3/1990 | Orosz et al. | |
| 4,930,746 A | 6/1990 | Reinicke | |
| 5,083,744 A | 1/1992 | Reinicke et al. | |
| 5,242,150 A * | 9/1993 | Shiffler et al. .......... | 251/209 |
| 5,504,409 A | 4/1996 | Elrod, Jr. | |
| 5,551,481 A | 9/1996 | Elrod, Jr. | |
| 5,865,207 A * | 2/1999 | Voit et al. ............... | 137/68.21 |
| 6,000,678 A | 12/1999 | Coakley | |
| 6,308,723 B1 | 10/2001 | Louis et al. | |
| 6,334,604 B1 | 1/2002 | Roth | |
| 6,808,162 B2 * | 10/2004 | Tranovich et al. ....... | 251/209 |
| 2003/0160199 A1 * | 8/2003 | Bareis et al. ........... | 251/129.11 |
| 2004/0079913 A1 * | 4/2004 | Lawson ................. | 251/129.11 |

* cited by examiner

*Primary Examiner*—John Rivell
(74) *Attorney, Agent, or Firm*—Ingrassia Fisher & Lorenz (57) ABSTRACT

A fuel control valve (100) includes a rotary throttling valve assembly (4,7) providing one or more of the benefits of being lightweight, having a relatively low power consumption, having a fail-closed structure and/or zero leakage. The fuel control valve (100) is a rotary, throttling valve that is actuated via a rotary torque motor (70). The valve (7) can be spring loaded for providing positive shutoff. Position indication of the valve (7) is obtained via a position sensor (31) and cam (13) mounted to the throttling valve shaft at a driven end (98). In a de-energized state, a torsion spring (45) is provided that is loaded to rotate the valve (7) to the closed position. The fuel control valve (100) may be advantageously utilized in extreme operating environments, e.g., such as extreme temperature and vibration environments found in missile control fuel systems.

14 Claims, 13 Drawing Sheets

ELECTRIC DRIVEN, INTEGRATED METERING AND SHUTOFF VALVE FOR FLUID FLOW CONTROL

RELATED APPLICATION

This application claims priority under 35 U.S.C. §119(e) of U.S. Provisional Application 60/536,240 filed on Jan. 14, 2004, the entire contents of which are herein incorporated by reference.

TECHNICAL FIELD AND INDUSTRIAL APPLICABILITY OF THE INVENTION

The present invention is generally directed to the field of valves, and more particularly to the field of engine fuel control valves and systems utilizing an electromechanical rotary, throttling or metering valve.

BACKGROUND OF THE INVENTION

The inventors of the present invention have determined that there are numerous shortcomings with the methods and apparatus of the background art relating to aircraft fuel systems, specifically relating to the method and apparatus relating to the metering of fuel in a high altitude and extreme shock and temperature operating environment.

SUMMARY OF THE PRESENT INVENTION

The present invention overcomes several shortcomings associated with the background art and achieves other advantages not realized by the background art. The present invention is intended to alleviate one or more of the following problems and shortcomings of the background art specifically identified hereinabove by the inventors with respect to the background art.

The present invention, in part, is a recognition that it will be advantageous to provide a lightweight fuel control valve for an airborne fuel system.

The present invention, in part, is a recognition that it will be advantageous to provide a lightweight fuel control valve for a fuel system that has a relatively low power consumption.

The present invention, in part, is a recognition that it will be advantageous to provide a fuel control valve having a fail closed operating position.

The present invention, in part, is a recognition that it will be advantageous to provide a zero leakage fuel control valve.

The present invention, in part, provides a fuel control valve comprising a valve housing having a fuel inlet and a fuel outlet; a rotary valve operatively engaged with a sleeve within the valve housing, wherein the rotary valve is provided with at least one metering flow window for controlling a fuel flow through the fuel inlet and fuel outlet; a rotary torque motor operatively engaged with the rotary valve for providing a rotational activation force to the rotary valve assembly to control the fuel flow through the fuel inlet and fuel outlet; and a spring biasing the rotary valve to an end position having near zero flow through the fuel outlet in a de-energized state, wherein the de-energized-state occurs when electrical power is discontinued to the rotary torque motor.

The present invention, in part, provides a fuel control valve comprising a valve housing having a fuel inlet and a fuel outlet; a rotary valve assembly operatively engaged with a sleeve within the valve housing, wherein the rotary valve is provided with at least one metering flow window for controlling a fuel flow through the fuel inlet and fuel outlet; a limited angle, rotary torque motor operatively engaged with the rotary valve for providing a rotational activation force to the rotary valve to control the fuel flow through the fuel inlet and fuel outlet; and a position sensing device operatively connected to the rotary torque motor to sense a position of the rotary valve responsive to the rotational activation force.

The present in part, provides a fuel control valve comprising a valve housing having a fuel inlet and a fuel outlet; a rotary valve operatively engaged with a sleeve within the valve housing, wherein the rotary valve is provided with at least one metering flow window for controlling a fuel flow through the fuel inlet and fuel outlet; a rotary torque motor operatively engaged with the rotary valve for providing a rotational activation force to the rotary valve assembly to control the fuel flow through the fuel inlet and fuel outlet; a spring biasing the rotary valve to an end position having near zero flow through the fuel outlet in a de-energized state, wherein the de-energized state occurs when electrical power is discontinued to the rotary torque motor; and a ball screw drive for transferring the rotational activation force into a linear and circumferential movement of the rotary valve.

The present invention, in part, provides a fuel system and a method of metering fuel in a fuel system utilizing one or more of the unique, aforementioned fuel control valves of the present invention.

BRIEF DESCRIPTION OF THE DRAWINGS

The present invention will become more fully understood from the detailed description given hereinafter and the accompanying drawings that are given by way of illustration only, and thus do not limit the present invention.

DETAILED DESCRIPTION OF THE PREFERRED EMBODIMENTS

The present invention will now be described in detail with reference to the accompanying drawings. The present invention is intended to provide one or more of the following advantageous features in conjunction with stationary, marine or airborne fuel systems, e.g., such as a fuel control valve for a ramjet fuel system or for smaller, non-variable geometry engines such as Auxiliary Power Units (APUs). The fuel control valve 100 of the present invention provides a relatively small fuel control system with one or more of the following features of zero servo flow, a positive shutoff function, the ability to meter flow over a roughly 97 percent range, and/or with maximum flows approaching 12,000 lbs/hr.

Figure 1:
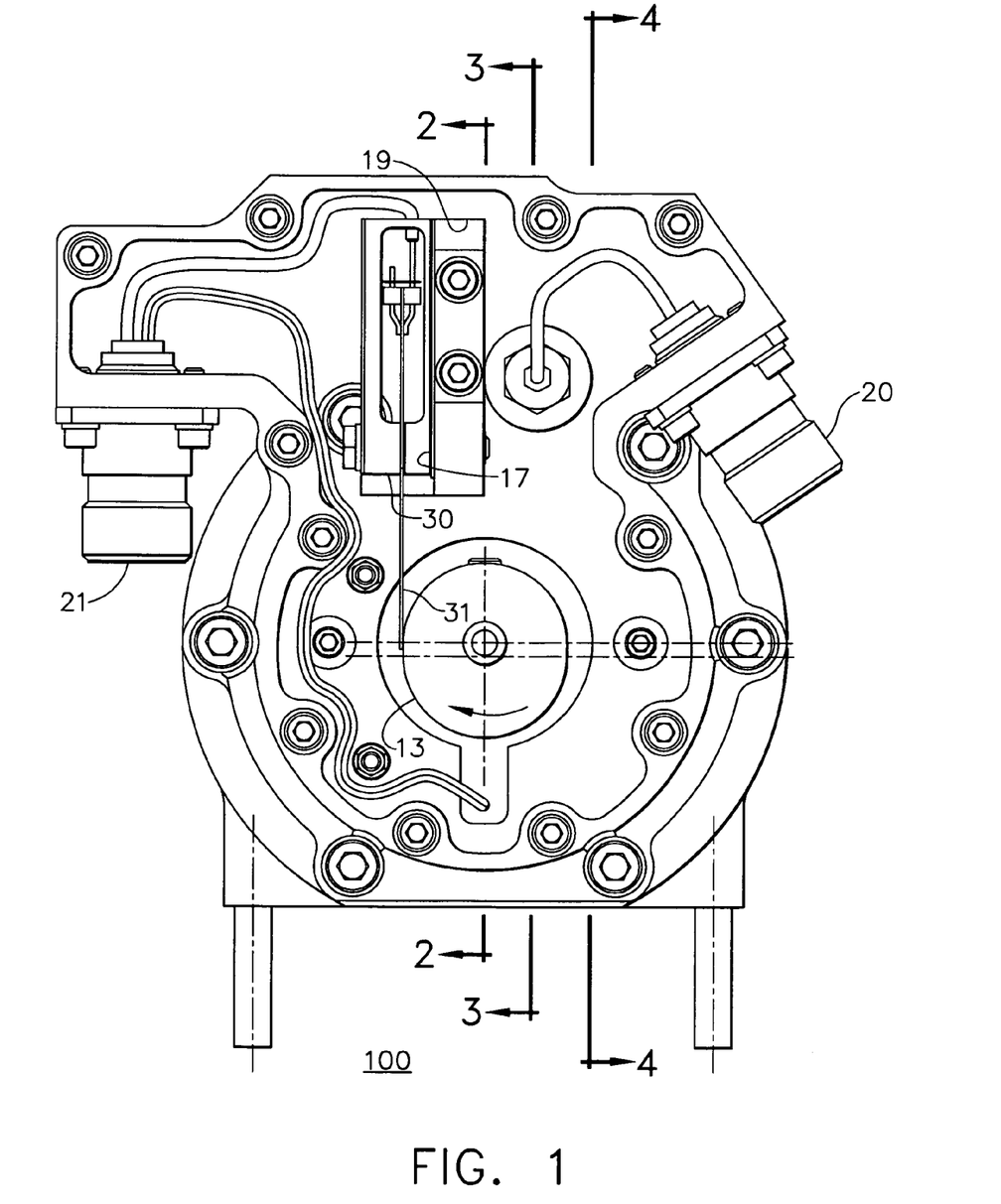
FIG. 1 is an end view of a fuel control valve according to an embodiment of the present invention.
Figure 2:
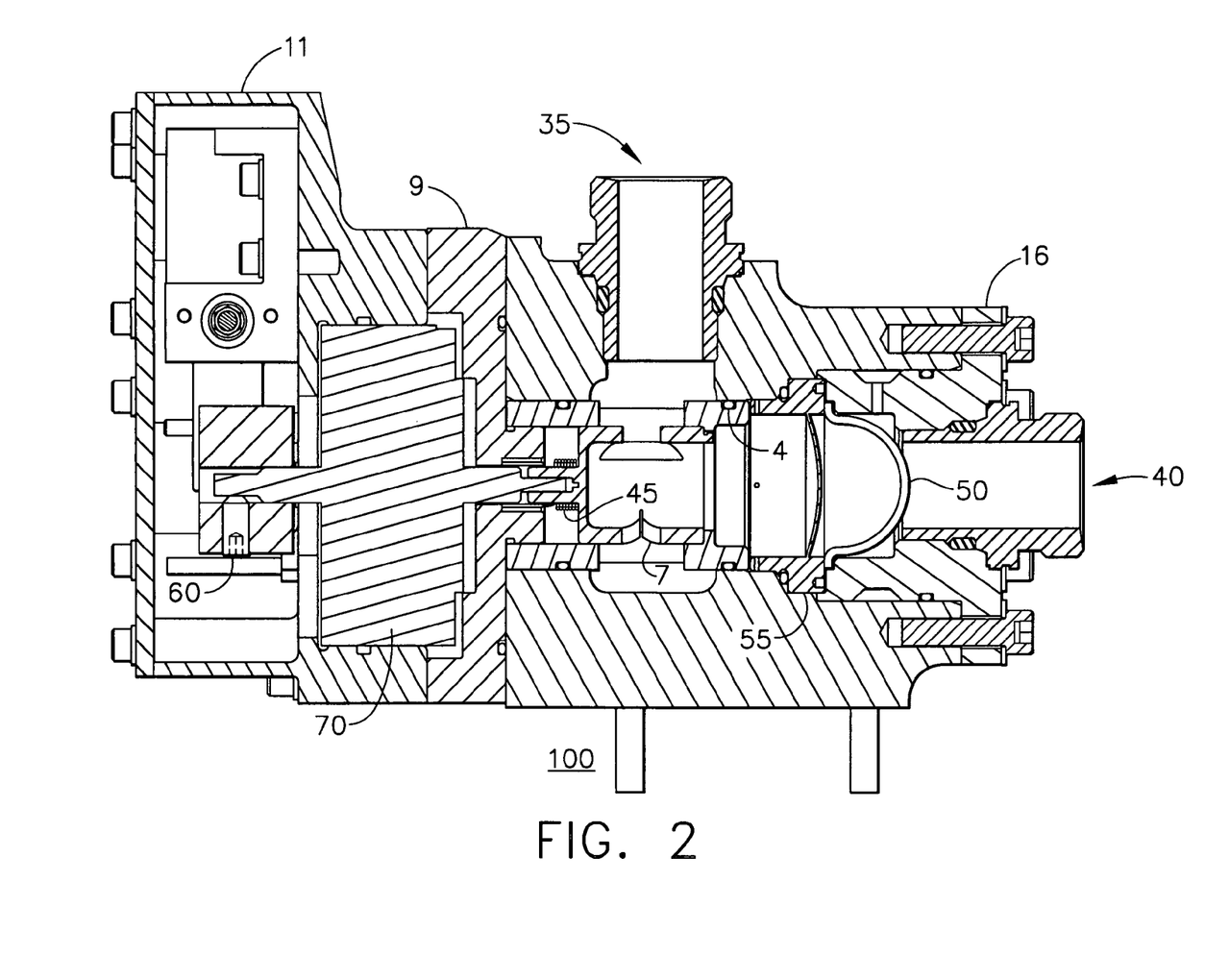
FIG. 2 is a sectional view of the fuel control valve taken along line 2-2 in FIG. 1.
Figure 3:
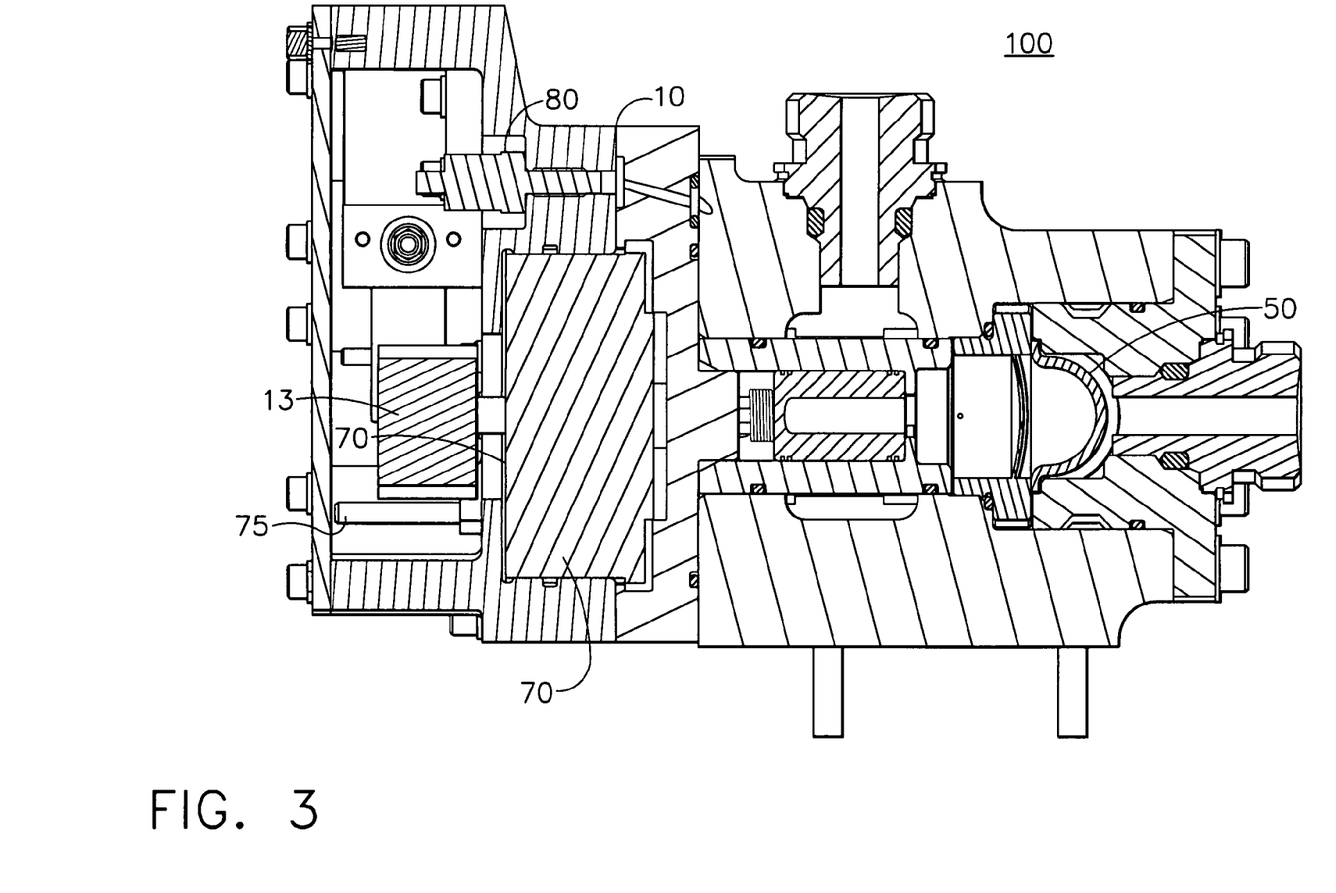
FIG. 3 is a sectional view of the fuel control valve taken along line 3-3 in FIG. 1.
Figure 4:
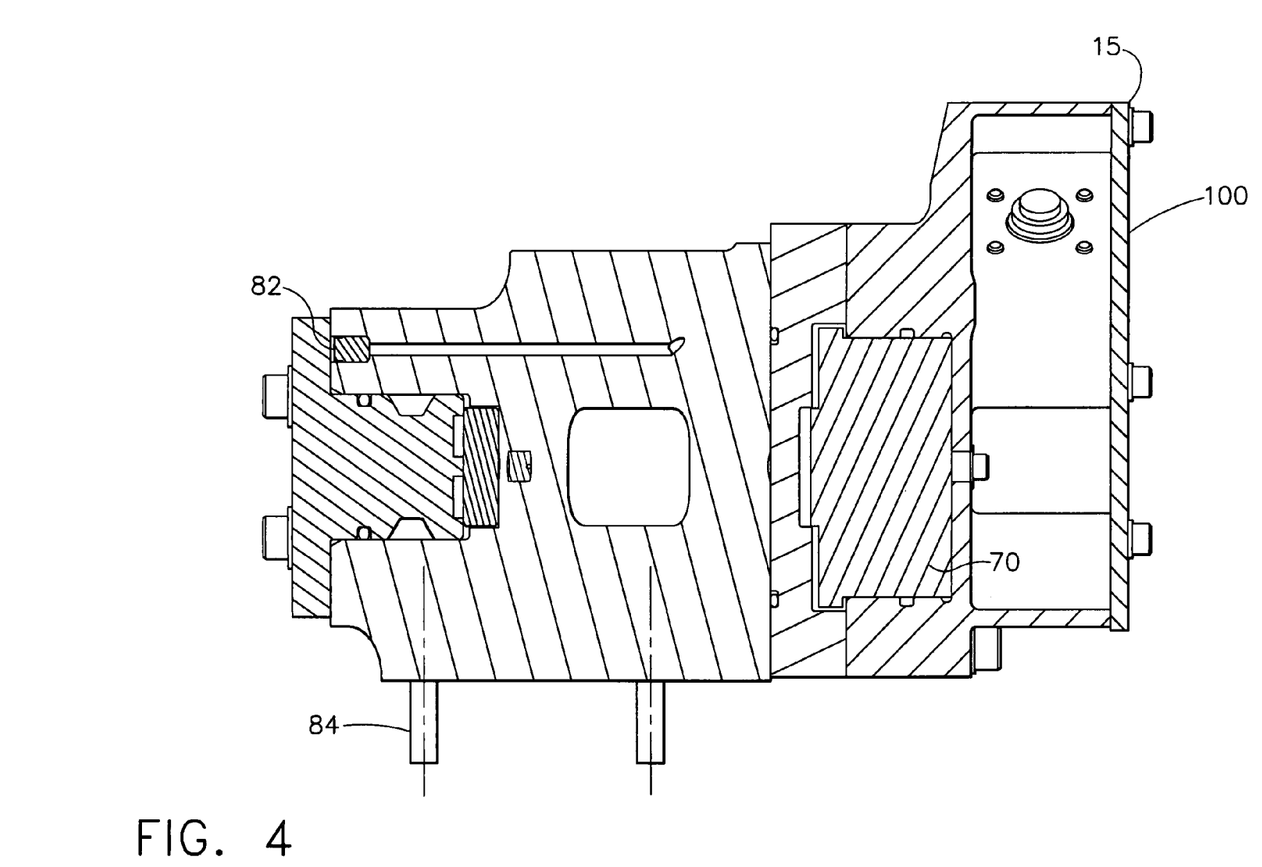
FIG. 4 is a sectional view of the fuel control valve taken along line 4-4 in FIG. 1.
Figure 5:
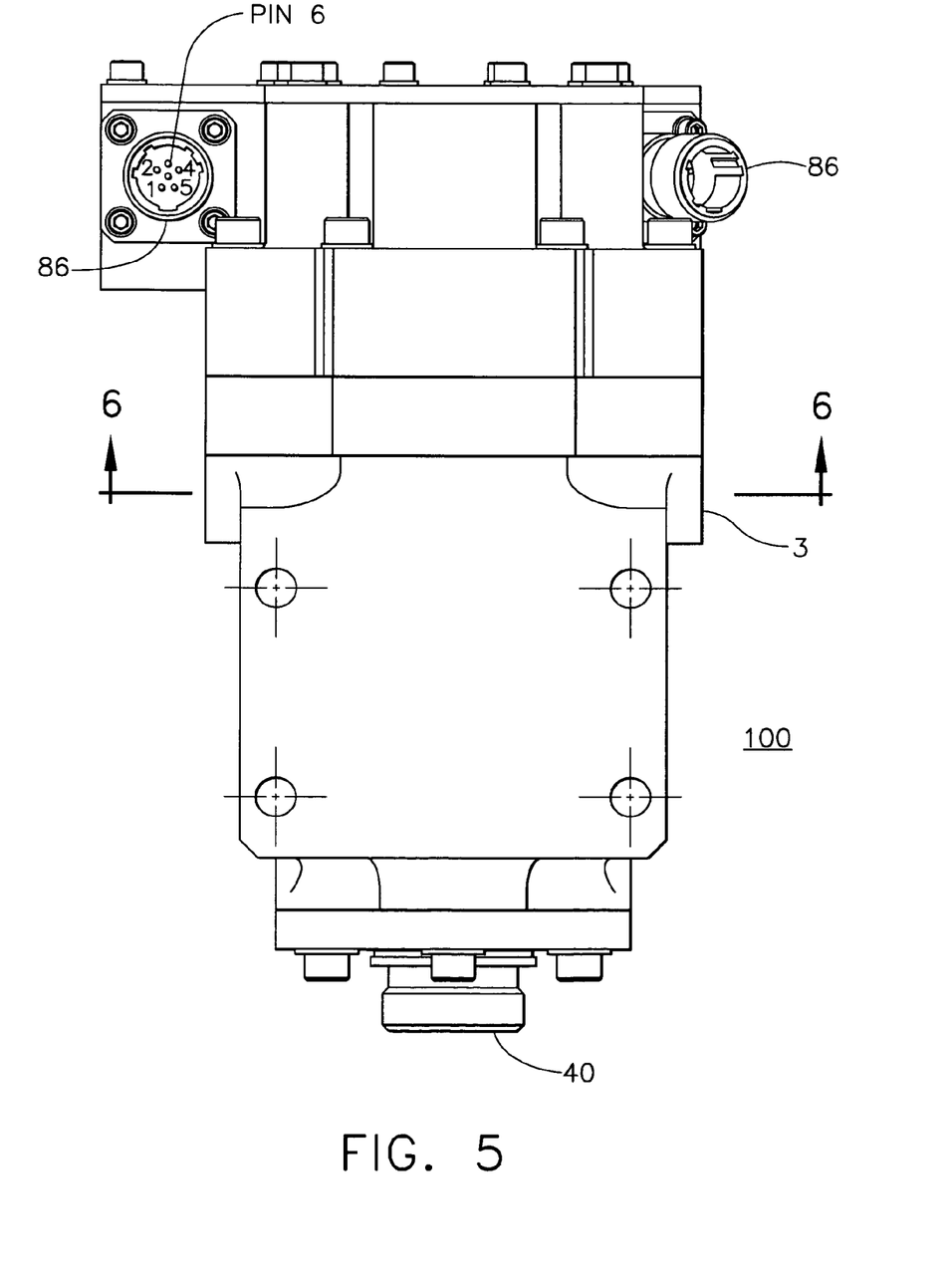
FIG. 5 is a plan view of a fuel control valve according to an embodiment of the present invention.
Figure 6:
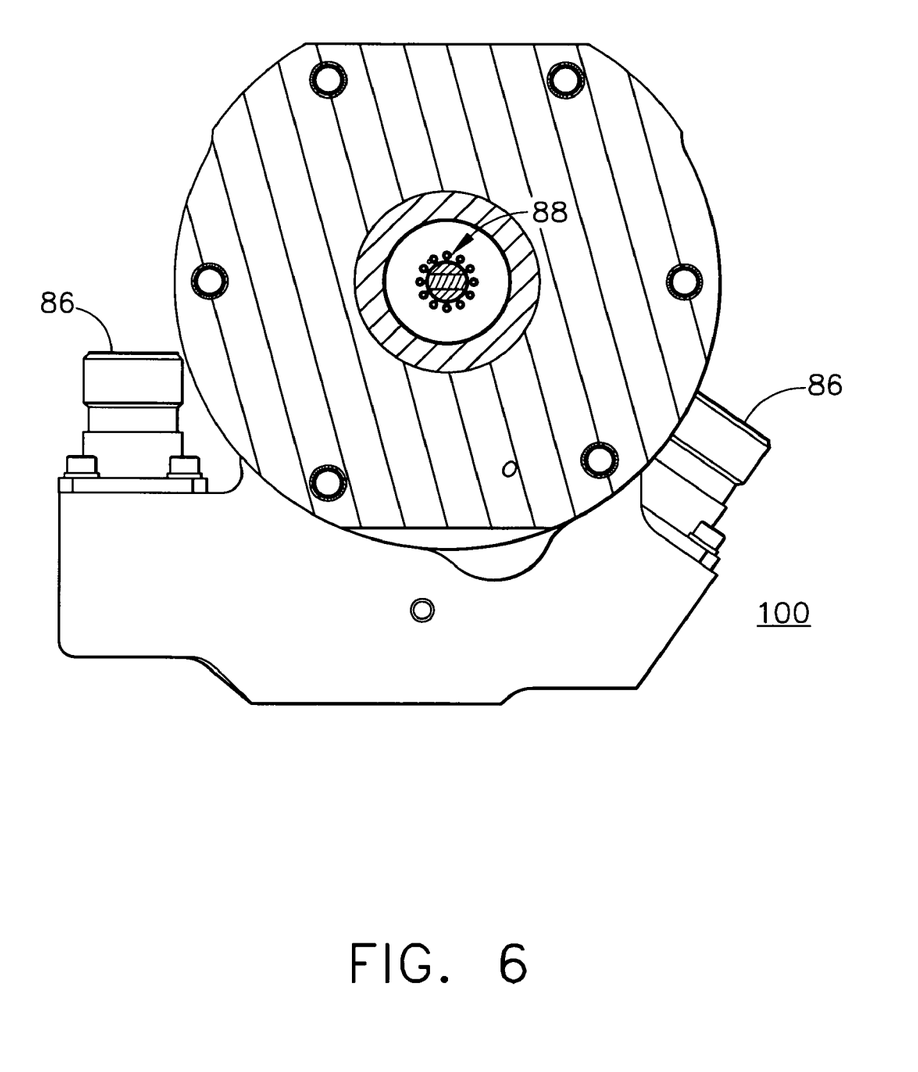
FIG. 6 is a sectional view of the fuel control valve taken along line 6-6 in FIG. 5.

FIG. 1 is an end view of a fuel control valve according to an embodiment of the present invention. FIG. 2 is a sectional view of the fuel control valve taken along line 2-2 in FIG. 1. FIG. 3 is a sectional view of the fuel control valve taken along line 3-3 in FIG. 1. FIG. 4 is a sectional view of the fuel control valve taken along line 4-4 in FIG. 1. FIG. 5 is a plan view of a fuel control valve according to an embodiment of the present invention. FIG. 6 is a sectional view of the fuel control valve taken along line 6-6 in FIG. 5.

As seen in FIGS. 1-4, a fuel control valve 100 according to a first embodiment of the present invention utilizes a position sensor 31 including a position sensor cam 13, a clamp and beam assembly 30, a position sensor shim 17 and a bracket assembly 19 for the position sensor 31. A keyway 86 for accommodating electrical connections 20, 21 for the valve 100.

As generally seen in FIGS. 1-14, fuel flows through the fuel control valve 100 from a fuel inlet port 35 to a metered fuel outlet port 40. A rupture disc assembly 55 with a screen 50 downstream thereof is also provided inline with the metered fuel outlet port 40. The metering function of the fuel control valve 100 is provided by a sleeve 4 and valve 7 operatively engaged within a main fuel metering chamber. The valve 7 is provided with a pair of metering windows 92 in a preferred embodiment that may be provided with a specific geometry to control the rate and/or volume of fuel flow through the control valve 100. For example, a pair of triangular shaped metering windows 92 are shown (FIG. 11), but alternatively shaped metering windows 92, e.g., such as an area bounded by an exponential curve may also be employed as necessary to provide controlled increases in fuel flow.

A motor housing assembly 9, clamp assembly 11 and adaptor plate 16 are shown in FIG. 2. A setscrew 60 is shown in FIG. 2 for securing the position sensor excitation cam 13 to the limited angle torquer 70 to provide the position of the valve 7. The limited angle torquer 70 (see FIG. 3) is provided for operatively controlling the rotation of the valve 7 relative to the sleeve 4 of the fuel control valve 100. Positive position feedback is provided by the use of a sensor, cantilevered beam 31 and a cam 13. Specifically, the fuel control valve 100 in a preferred embodiment utilizes a piezo-resistive position indicator 30 as shown and described in U.S. Pat. No. 6,308,723 to Louis et al., the entirety of which is hereby incorporated by reference.

A spring 45, such as a torsion spring (FIG. 2) or a load control spring (FIG. 16) provides a spring force between the valve 7 and the limited angle torquer 70. An insulating sleeve 75 shown in FIG. 3 provides protection from chaffing of the limited angle torquer 70 wires. A pressure sensor 80 positioned in a pressure tap in the housing provides an electrical signal of the output pressure of the fuel control valve 100.

As will be appreciated by one of ordinary skill in the art, several gaskets and seals have also been provided to seal against environmental intrusion and/or fluid leakage in the vicinity of the valve 7 and sleeve 4 assembly. In addition, several fasteners may be employed to hold the motor housing assembly 9 and related components of the fuel control valve 100 body 3 in a fully assembled state. For example, a polytetrafluoroethylene gasket 10 is shown between the motor housing assembly 9 and the main body 3 of the fuel control valve 100. The torsion spring 45 of the fuel control valve 100 can be adjusted through a set of holes 88 in the motor housing 3 shown in FIG. 6.

Figure 7:
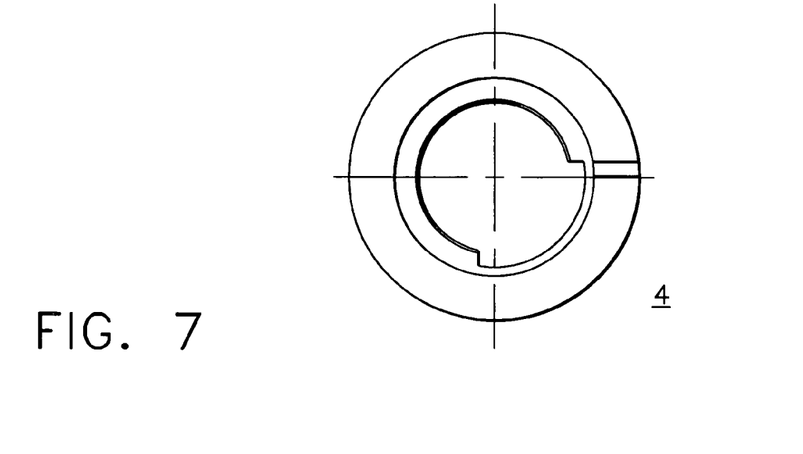
FIG. 7 is an end view of a sleeve for a fuel control valve according to an embodiment of the present invention.
Figure 8:
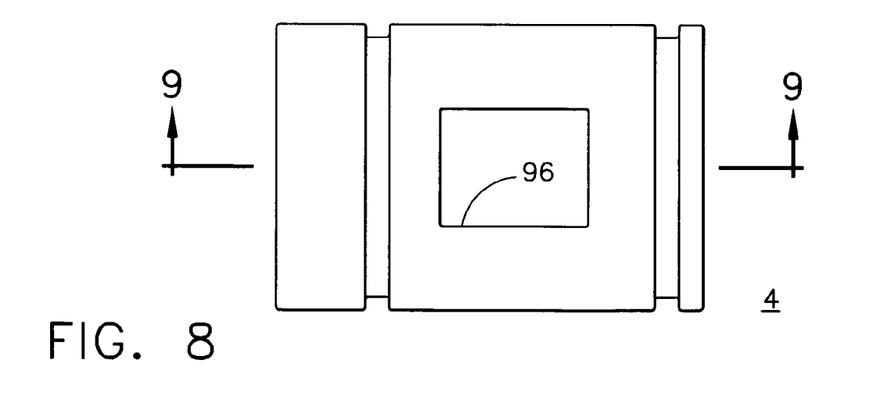
FIG. 8 is a side view of a sleeve for a fuel control valve according to an embodiment of the present invention.
Figure 9:
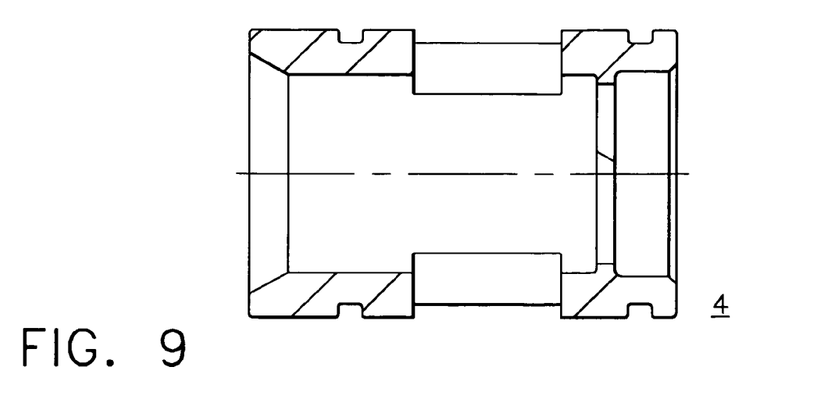
FIG. 9 is a sectional view of the sleeve taken along line 9-9 in FIG. 8.
Figure 10:
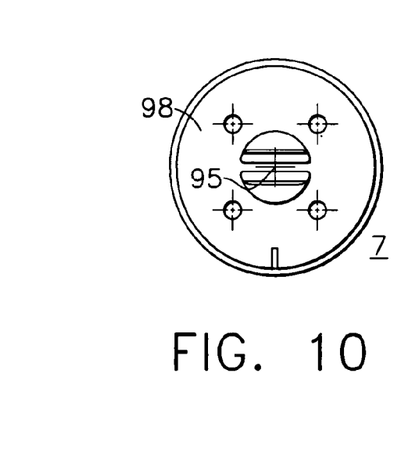
FIG. 10 is an end view of valve for a fuel control valve according to an embodiment of the present invention.
Figures 11, 12:
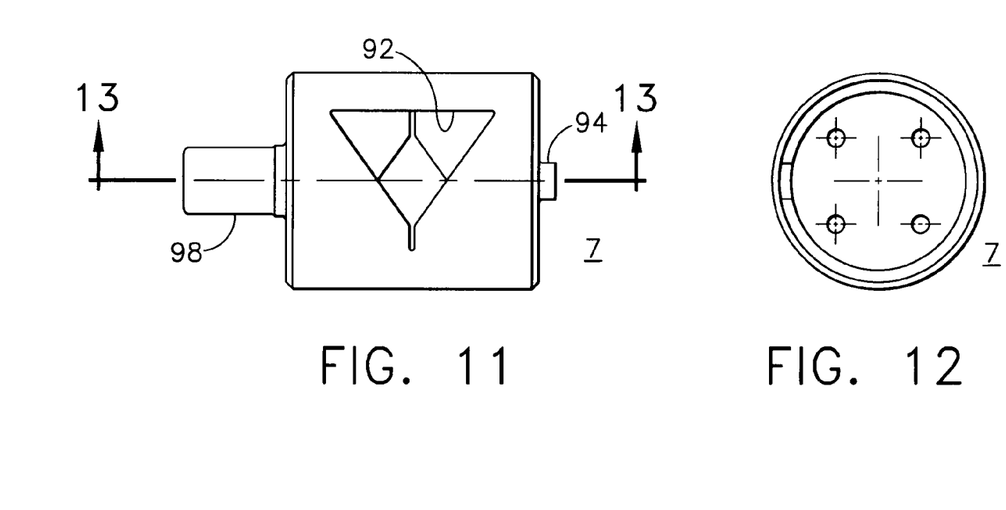
FIG. 11 is a side view of valve for a fuel control valve according to an embodiment of the present invention.
FIG. 12 is an end view of valve for a fuel control valve according to an embodiment of the present invention.
Figure 13:
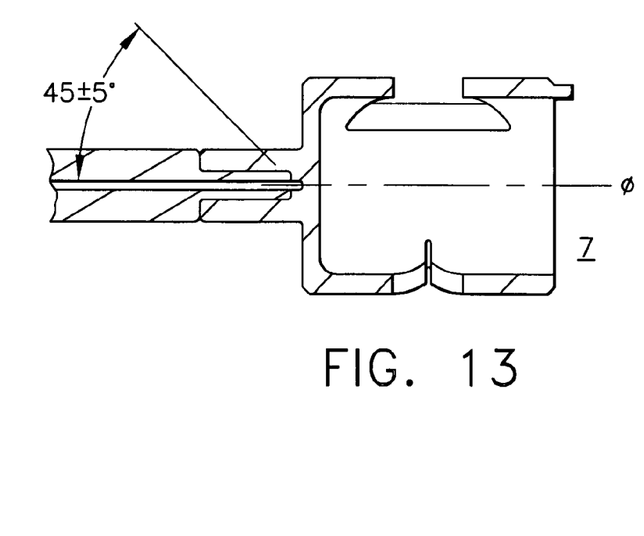
FIG. 13 is a sectional view of the valve taken along line 13-13 in FIG. 11.

FIG. 7 is an end view of a sleeve 4 for a fuel control valve 100 according to an embodiment of the present invention. FIG. 8 is a side view of a sleeve 4 for a fuel control valve 100 according to an embodiment of the present invention. FIG. 9 is a sectional view of the sleeve 4 taken along line 9-9 in FIG. 8. FIG. 10 is an end view of valve 7 for a fuel control valve 100 according to an embodiment of the present invention. FIG. 11 is a side view of valve 7 for a fuel control valve 100 according to an embodiment of the present invention. FIG. 12 is an end view of valve 7 for a fuel control valve 100 according to an embodiment of the present invention. FIG. 13 is a sectional view of the valve 7 taken along line 13-13 in FIG. 11.

The valve 7 is a rotary type throttling valve that is operatively engaged with a sleeve assembly 4. The limited angle torque motor 70 is a rotary torque motor that imparts a rotational actuation force to the rotary valve 7 within the sleeve 4. As seen in FIGS. 2, 3, 10, 11 and 13, the valve 7, is spring loaded via the torsion spring 45. For example, in the de-energized state, the torsion spring 45 is mounted on the driven end 98 of the valve 7 (see FIGS. 10, 11 and 13) and will rotate the valve 7 to the closed operating position, e.g., near zero flow. One skilled in the art will appreciate that flow through the metering windows 96, 92 of the sleeve 4, and the valve 7, respectively, occurs when the valve 7 is rotated so that the area of the metering windows 92 is aligned with the corresponding windows 96 of the sleeve 4.

Figure 14:
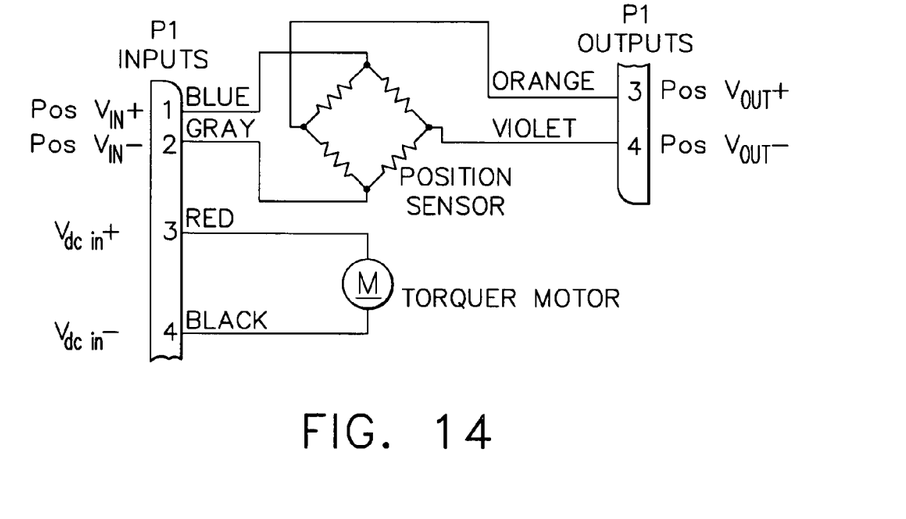
FIG. 14 is the electrical interface schematic of fuel control valve in the present invention.
Figure 15:
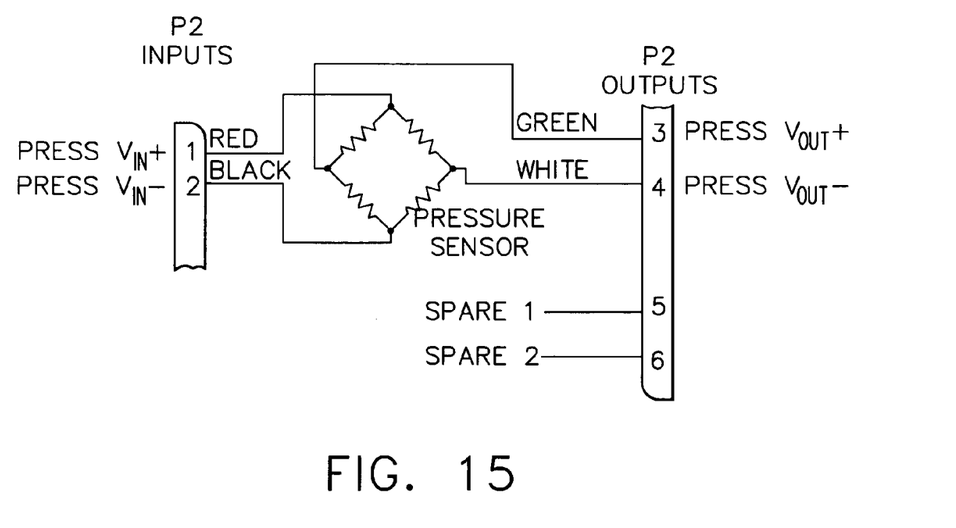
FIG. 15 is the electrical interface schematic of fuel control valve in the present invention.

FIG. 14 and FIG. 15 is an exemplary electrical interface schematic for the fuel control valve 100 in the present invention. FIG. 14 provides schematic views of the limited angle torquer 70 and position sensor 31 of the fuel control valve. FIG. 15 provides the schematic view of the pressure sensor 80 of the fuel control valve 100.

As seen in FIGS. 1-3 and 14, the fuel control valve 100 will include the valve position sensing device 30 which is normally excited by a direct current voltage; and a sensor 31 comprising a piezo-resistive Wheatstone bridge and having a first portion. The sensor 31 is electrically communicated with the voltage supply, and the sensor 31 is operably disposed with the rotary torque motor 70. The first portion is displaceable by the rotary torque motor 70, and the sensor 31 is designed to produce at least one output signal corresponding and proportional to displacement of the first portion by the rotary torque motor 70.

The sensor may include a plurality of piezo-resistive elements coated with, and affixed to a metal substrate by a ceramic. The sensor 31 is electrically communicated with a voltage supply, and is operably disposed with the rotary torque motor 70. A first portion of the sensor 31, e.g., cam 13, is displaceable by the rotary torque motor 70 and the sensor produces at least one output signal corresponding and proportional to displacement of the first portion by the rotary torque motor 70.

Figure 16:
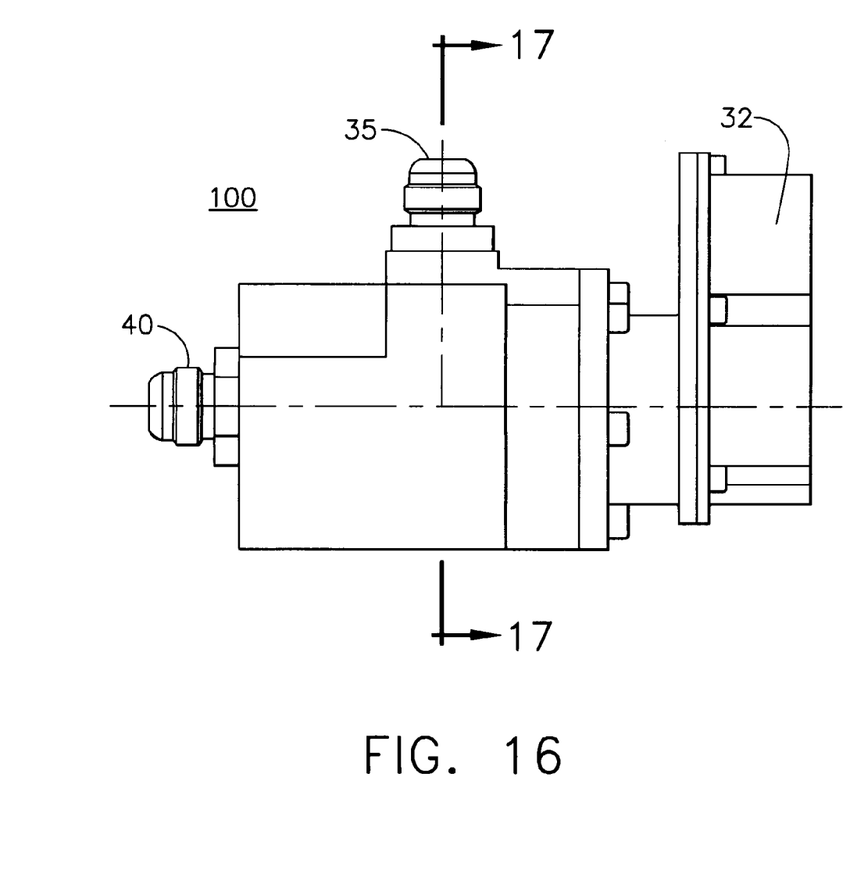
FIG. 16 is a side view of a fuel control valve according to a second embodiment of the present invention.
Figure 17:
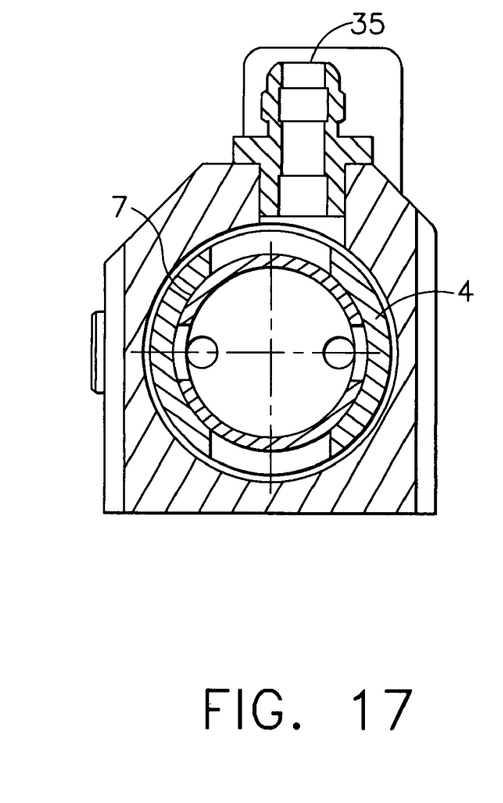
FIG. 17 is a sectional view of the fuel control valve taken along line 17-17 in FIG. 16.
Figure 18:
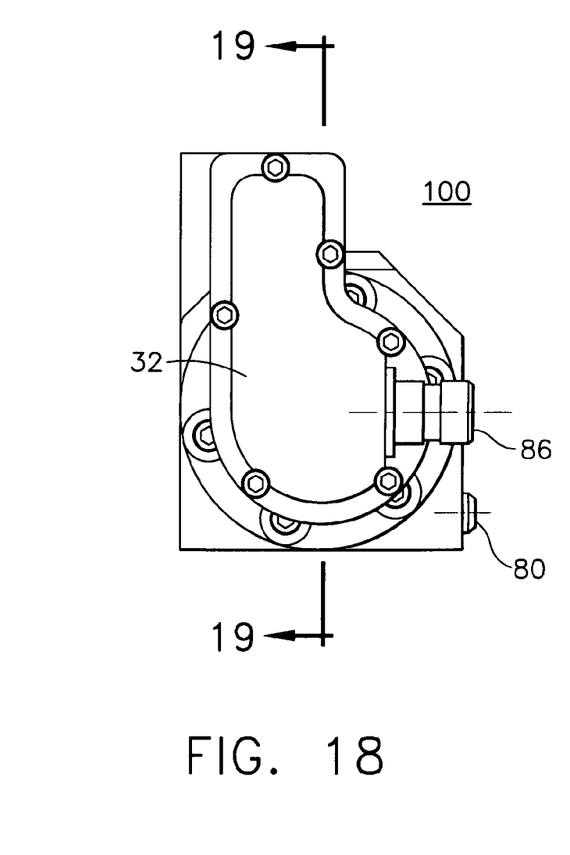
FIG. 18 is an end view of a fuel control valve according to a second embodiment of the present invention.
Figure 19:
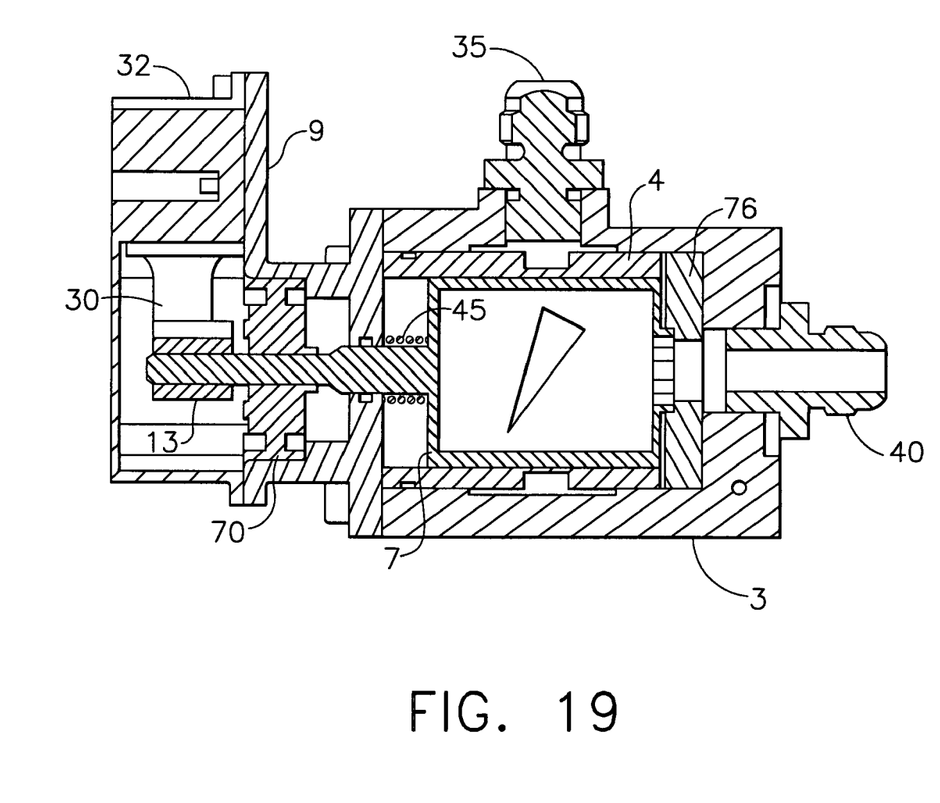
FIG. 19 is a sectional view of the fuel control valve taken along line 19-19 in FIG. 18.
Figure 20:
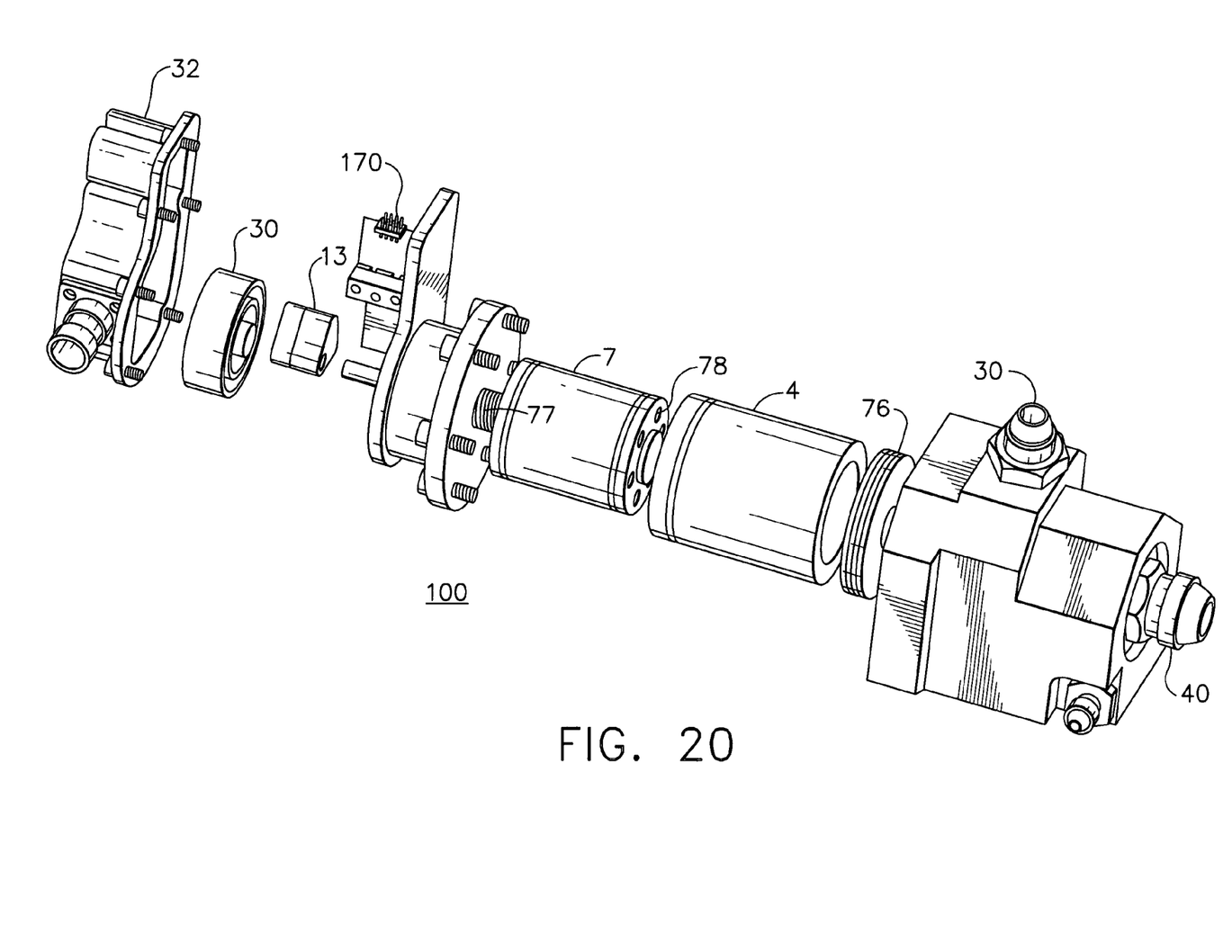
FIG. 20 is an exploded view of a fuel control valve according to a second embodiment of the present invention.
Figure 21:
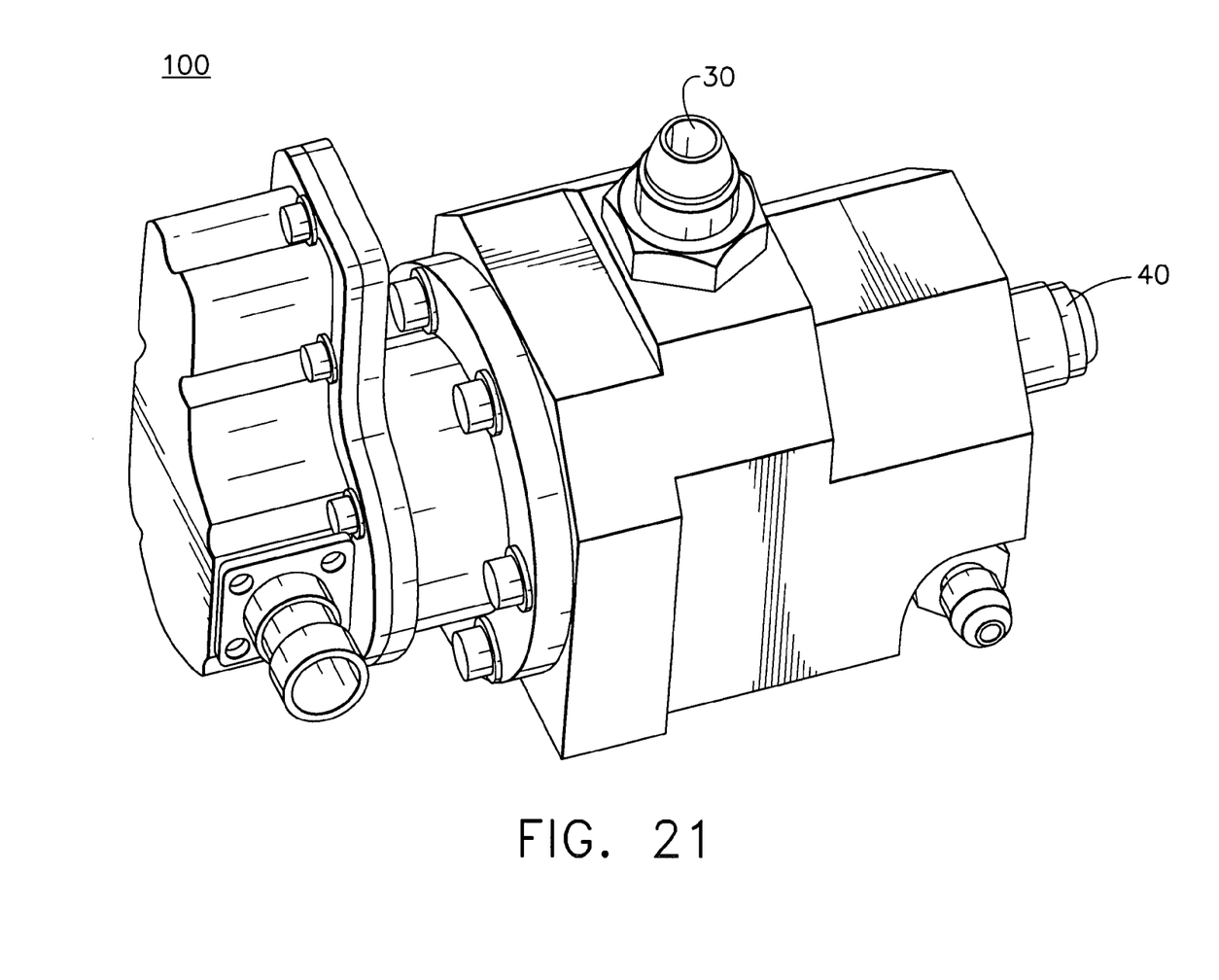
FIG. 21 is an isometric view of a fuel control valve according to the second embodiment of the present invention.

FIG. 16 is a side view of a fuel control valve according to a second embodiment of the present invention. FIG. 17 is a sectional view of the fuel control valve taken along line 17-17 in FIG. 16. FIG. 18 is an end view of a fuel control valve according to a second embodiment of the present invention. FIG. 19 is a sectional view of the fuel control valve taken along line 19-19 in FIG. 18. FIG. 20 is an exploded view of a fuel control valve according to a second embodiment of the present invention. FIG. 21 is an isometric view of a fuel control valve according to the second embodiment of the present invention.

FIGS. 16-21 show a second embodiment of the present invention in which a rotary torque motor 70 drives a rotary valve 7 that is articulated both axially and circumferentially by a dual (two-step) ball screw drive 77. Positive position feedback is still provided by the use of a sensor 31 having a beam assembly 30 on a cam 13, e.g., the piezo-resistive position indicator 31 as shown and described in U.S. Pat. No. 6,308,723 to Louis et al., the entirety of which is hereby incorporated by reference, is equally applicable to the second embodiment.

As shown in FIGS. 16-18, the fuel control valve (100) provides the integration of the shutoff function with the metering function. Shutoff function is typically provided by a separate valve in the fuel systems of the background art. However, the present invention incorporates a spring 45 to drive the valve 7 to a closed position in the event of loss of electrical power. Accordingly, a combined shutoff and metering function that is electrically, directly driven off of a single rotary torque motor 70 can be provided.

The fuel control valve 100 of the present invention optimizes the size, weight, and performance of the fuel control valve. The approach has the added flexibility of being able to provide valve contouring for tighter control of the turn down ratio. The design is based on a rotary throttling valve 7 and sleeve 4 assembly that is driven through a rotary torque motor 70. An exploded view of the valve 100 is shown in FIG. 20. Some of the key features of the valve design are the fuel control valve is relatively light in weight, e.g., may be less than 3.1 pounds, the fuel control valve can be configured to fail closed, the valve has a relatively low power consumptions, e.g. power consumption can be less than 5 watts, and can provide zero leakage.

The fuel control valve 100 is a rotary, throttling valve that is actuated via a rotary torque motor 70. The valve 7 may be spring 45 loaded for positive sealing, e.g., as describe hereinabove with respect to the first embodiment. Positive position indication of the valve position sensor is obtained via a position sensor 31 and cam 13 mounted to the torquer motor drive shaft that is connected to the throttling valve shaft on the driven end 98 of the valve 7. The position sensor 31 which includes the cam 13 and beam assembly 30 described hereinabove is housed within an electrical cover 32 and is operatively connected to the rotary torque motor 70. The rotary torque motor 70 drives the valve 7 and sleeve 4 assembly on a ball screw drive 77. When the windows 92, 96 of the sleeve and valve are aligned to permit a flow of fuel through the inlet port 30, fuel is ultimately permitted to flow through the valve 100 when the valve 7 is unseated from a valve seat 76. A plurality of holes 78, e.g., six holes in a preferred embodiment, permit a flow of fuel from the end of the valve 7 to the outlet port 40.

In the valve 100 shown in FIGS. 16-21, there is a minimum of 5 psi of load against the compliant face seal to assure zero leakage in the de-energized state. If there is a pressure load difference of 115 psi across the input 35 to the outlet 40 the seal load will increase by an additional 4.5 pounds ensuring a leak-proof seal. In contrast, in the first embodiment, initial sealing has been provided by the rupture disc assembly 55.

The start-up sequence of the fuel control valve 100 will be initiated by having the electrical power come on prior to any significant inlet fuel pressure. It will be necessary for the valve position sensor 31 to be interrogated prior to the valve 7 being moved to calibrate the position sensor 31. Alternatively, the position sensor 31 can be calibrated on installation. After which the valve 7 is scheduled to open by first rapidly turning the torque motor 70 through roughly the first twenty percent of its travel which opens the valve through the positive shutoff region and into a metering region.

This movement of the valve 7 may be accomplished by a relatively high pitch on the ball screw drive 77, which lifts the throttling valve 7 roughly 0.090 inches, while the metering windows 92, 96 on the valve 7 and sleeve 4 are not yet aligned. During this portion of the valve 7 movement there will be minimal flow through the valve 7, e.g., on the order of 2-3 percent of the total flow assuming the highest pressure drop across the valve, e.g. of a pressure difference of 25 psi.

After the valve has been sequenced through the shutoff position, it is ready for flow throttling up to roughly 4 pps. During this portion of the valve 7 rotation there will be little or no translation of the valve because the ball screw 77 thread pitch is basically flat, e.g., there will be less than 0.010 translation. However, a minimal amount of translation is retained to assure the valve 7 reseals once the electrical power is turned off.

The position feedback system provides continuous position indication of the rotation of the valve. As described in U.S. Pat. No. 6,308,723, the position feedback is a type of strain gauge position sensor 31 in a preferred embodiment. The position sensor 31 has the accuracy of high-end resolvers or RVDTs at a fraction of the cost and weight. The gain on the device is such that it will provide a change in the output voltage of 150 mV/10 VDC-excitation from a minimum to maximum rotation of the valve 7, e.g., with an accuracy on the order of one percent of full scale.

Therefore, the control of the valve 7 and subsequent control of the discharge pressure can be accomplished by closing the loop on the position feedback and hence controlling the orifice area defined by the metering windows 92, 96.

The pressure balanced valve assembly 4, 7 is pressure and load balanced by having dual valve metering windows 92 that will throttle the flow and in conjunction with the injector pressure will control the valve discharge pressure. As aforementioned in conjunction with the first embodiment of the present invention, the rotation of the valve 7 varies the minimum flow area in the valve 7 by changing the opening area seen by the sleeve and valve metering windows 92, 96. The valve 7 is provided with a pair of symmetric metering windows 96 in order to radially balance pressure across the valve 7. The valve 7 may also be pressure biased to be normally closed by vent holes at the top of the valve. This feature coupled with the spring 45 provides positive sealing pressures under all conditions. At the bottom or end (right side of the valve 7 in FIG. 20) the valve 7 there are six holes 78 that provide the flow passage to the final output port 40. As described above, these holes 78 are blocked to the output port 40 when the valve 7 is seated on the seat 76 in a zero flow condition.

In the second embodiment described in FIGS. 16-18, soft face seals (Viton) may be positioned at the bottom of the sleeve 4 and the combination of the pressure load and the load spring 45 ensures zero output leakage. The load spring 45 may be sized to provide a minimum of 5 pounds of sealing force during non-operating conditions (a pressure difference of 0 psi across the fuel control valve 100). PTFE loaded cap seals are provided around the metering shaft to prevent leakage from the pressure housing to the torque motor chamber in which the torque motor 70 is housed. A set of Viton O-Rings seal the metering sleeve 4 to body connection. The combinations of these seals assure zero leakage from the fuel control valve inlet 35 to any external valve surface.

As described above, a contoured metering profile can be provided as necessary to provide the metering accuracy required for safe engine operation, e.g., a triangular shaped metering window 92 has been shown in conjunction with the first embodiment (FIGS. 1-15) that provides a linear increase in flow. However, as aforementioned, the shape of valve window rotating inside of the rectangular sleeve windows can be contoured to provide various types of area versus travel profiles. Accordingly, numerous valve designs similar to the aforementioned embodiments may be produced with various shaped windows ranging from simple triangular profiles to complicated exponential contours, all depending on the application accuracy requirements, e.g., such as compensating for other non-linearity in the fuel system if needed.

The metering valve/seal is a single element that provides the contoured metering windows 92, 96 along with the shutoff-sealing surface. The position of the metering valve/seal is controlled by the two slope square thread that is driven by the torque motor 70 and ball screw 77 drive. This two step thread provides the 0.090 in rise of the valve 7 of the face seal in the first 30 degrees of rotation and near zero rise for the next 80-90 degrees of rotation. However, the final 80-90 degree of rotation of the limited angle torquer 70 is where the primary metering will take place.

The two step approach minimizes the stall load on the rotary torque motor 70 while retaining good spring closure force, and further minimizes the overall package size. However, as aforementioned with respect to the first embodiment, the two step ball screw 77 and seal can be eliminated by the rupture disk 55 described above and/or may be replaced with another type of ball screw drive if desired.

The rotary torque motor 70 proposed is a limited angle torque motor that provides up to 7 in-oz of torque at 14 Watts and 120 degrees of rotation. In a preferred embodiment, the peak torque output required by the motor 70 is less than 5 in-oz. The valve position indicator 31 proposed is a unique position sensor 30 that is further described in U.S. Pat. No. 6,308,723, the entirety of which has been incorporated by reference. The core sensing elements are from the same sensor. The sensor interface is typically a four wire system, with an impedance of 8 k Ohms. The sensor is designed to give 150 mV output at fullscale deflection for a 10 VDC excitation. The sensor is a highly sensitive, thick film, strain gauge that is fired on a ceramic-metal substrate.

The proposed sensor is excited by a cam 13 mounted to a shaft of the torquer motor 70 that is also connected to a driven end 98 of the valve 7 (in FIGS. 10-13). The cam 13 may be configured to have three major regions: a closed operating region, a transition region, and a throttling region. The closed region is a flat section that ensures the valve 7 is fully closed. The transition region is the next step area that shows the valve 7 is somewhere between closed and where the metering windows 92 begin to align. The third and final region is where the valve and sleeve metering windows 92, 96 are aligned. This region is where 80 percent of the sensor stroke is used. This approach maximizes the sensor's 31 operating range over the region of interest and gives positive indication in all of the valve 7 operating regions. However, it will be appreciated that the cam 13 may include may be configured to be a single, dual or three position operating cam. For example, each sensing segment of the cam 13 can be configured to include a specific rise to rotation characteristic. The valve body 3 may incorporate a pressure tap for the purpose of sensing the downstream pressure with a pressure sensor 80.

One of ordinary skill in the art will appreciate that various materials may be utilized for the components of the fuel control valve 100 of the preferred embodiments in order to provide optimum performance in a fuel system for a high altitude, airborne operating environment. For example, the material selection for a preferred valve 100 of the present invention is listed in the following table:

TABLE OF MATERIALS

| ITEMS | MATERIAL | COMMENTS |
| --- | --- | --- |
| Body (3) | Al | Hardcoat |
| Cover (32) | Al | Hardcoat |
| Electrical Connector (86) | Al | Std 38999 |
| Torque Motor Assembly (70) | Assembly | Corrosion Resistant Wear Surfaces |
| Motor Mount | Al | Hardcoat |
| Motor Seal (10) | PTFE | Reinforced cap Seal |
| Pressure Cover | Al | Hardcoat |
| Spring (45) | Steel | |
| Ball (76-Second Embodiment) | Steel | Hardcoat |
| Throttling Valve (7) | Al | Hardcoat PTFE Impregnated |
| Cap Seals | PTFE | Reinforced cap Seal |
| Sleeve (4) | Al | Hardcoat |
| Face Seal | PTFE | Reinforced cap Seal |
| Sleeve O-Rings | Viton | |
| Cam (13) | Al | Hardcoat PTFE Impregnated |

What is claimed is:

1. A fuel control valve comprising:
a valve housing having a fuel inlet and a fuel outlet;
a rotary valve operatively engaged with a sleeve within said valve housing, wherein said rotary valve is provided more than one metering flow window for controlling a fuel flow through the fuel inlet, into an interior of said rotary valve via said more than one metering window, and out an end of said valve to said fuel outlet, said rotary valve including a plurality of holes on an end thereof, said plurality of holes being connected to an internal pressure of said valve;

a direct drive rotary torque motor operatively engaged with said rotary valve for providing a rotational activation force to said rotary valve assembly to control the fuel flow through the fuel inlet and fuel outlet; and a spring biasing said rotary valve to an end position having near zero flow through the fuel outlet in a de-energized state, wherein said de-energized state occurs when electrical power is discontinued to said rotary torque motor.

2. The fuel control valve according to claim 1, further comprising a position sensing device operatively connected to said rotary torque motor via a sensing cam to sense a position of the rotary valve assembly responsive to the rotational activation force.

3. The fuel control valve according to claim 2, wherein the position sensing device further includes a sensor having a plurality of piezo-resistive elements coated with, and affixed to a metal substrate by a ceramic and having a first portion, said sensor electrically communicating with a voltage supply, said sensor operably disposed with the rotary torque motor, said first portion displaceable by the rotary torque motor, said sensor producing at least one output signal corresponding and proportional to displacement of said first portion by the activation force.

4. The fuel control valve according to claim 3, wherein the position sensing device includes a position operating cam having at least one position sensing segment and operatively engaged with said rotary torque motor.

5. The fuel control valve according to claim 1, wherein each metering flow window is provided with a contoured profile, wherein an area and a geometry of said contoured profile provides control of the fuel flow between the fuel inlet and the fuel outlet.

6. The fuel control valve according to claim 1, wherein at least two metering flow windows are positioned symmetrically with respect to the circumference of the rotary valve assembly.

7. The fuel control valve according to claim 1, further comprising:

a ball screw drive for transferring said rotational activation force into a linear and circumferential movement of said rotary valve.

8. The fuel control valve according to claim 7, wherein said outlet end of said valve is operatively engaged with a valve seat being positioned between said fuel outlet and said fuel inlet.

9. The fuel control valve according to claim 7, further comprising a position sensing device operatively connected to said rotary torque motor to sense a position of the rotary valve responsive to the rotational activation force.

10. A fuel control valve comprising:

a valve housing having a fuel inlet and a fuel outlet;

a rotary valve assembly operatively engaged with a sleeve within said valve housing, wherein said rotary valve is provided with more than one metering flow window for controlling a fuel flow through the fuel inlet, into an interior of said rotary valve via said more than one metering flow window, and out an end of said valve to said fuel outlet, said rotary valve including a plurality of holes on an end thereof, said plurality of holes being connected to an internal pressure of said valve;

a limited angle, direct drive rotary torque motor operatively engaged with said rotary valve for providing a rotational activation force to said rotary valve to control the fuel flow through the fuel inlet and fuel outlet; and a position sensing device operatively connected to said rotary torque motor to sense a position of the rotary valve responsive to the rotational activation force.

11. The fuel control valve according to claim 10, wherein the position sensing device further includes a sensor having a plurality of piezo-resistive elements coated with, and affixed to a metal substrate by a ceramic and having a first portion, said sensor electrically communicating with a voltage supply, said sensor operably disposed with the rotary torque motor, said first portion displaceable by the rotary torque motor, said sensor producing at least one output signal corresponding and proportional to displacement of said first portion by said rotary torque motor.

12. The fuel control valve according to claim 10, wherein each metering flow window is provided with a contoured profile, wherein an area and a geometry of said contoured profile provides control of the fuel flow between the fuel inlet and the fuel outlet.

13. The fuel control valve according to claim 10, wherein at least two metering flow windows are positioned symmetrically with respect to the circumference of the rotary valve assembly.

14. The fuel control valve according to claim 10, wherein the valve position sensing device includes a direct current voltage supply; and a sensor comprising a piezo-resistive Wheatstone bridge and having a first portion, said sensor electrically communicating with said voltage supply, said sensor operably disposed with the rotary torque motor, said first portion displaceable by the rotary torque motor, said sensor producing at least one output signal corresponding and proportional to displacement of said first portion by the actuating member.

* * * * *